United States Patent

Quesnel et al.

[11] Patent Number: 5,879,820
[45] Date of Patent: Mar. 9, 1999

[54] MULTILAYER STACK OF FLUORIDE MATERIALS USABLE IN OPTICS AND ITS PRODUCTION PROCESS

[75] Inventors: Etienne Quesnel, Meylan; Jean-Yves Robic, Grenoble; Bernard Rolland, Meylan; Jean Dijon, Champagnier, all of France

[73] Assignees: Commissariat a l'Energie Atomique, Paris; Etat Francais, Armees, both of France

[21] Appl. No.: 879,616

[22] Filed: Jun. 20, 1997

[30] Foreign Application Priority Data

Jun. 21, 1996 [FR] France ................................ 96 07759

[51] Int. Cl.⁶ .................................................. B32B 9/00
[52] U.S. Cl. ........................ 428/688; 428/689; 428/699; 428/912.2; 428/913
[58] Field of Search ..................... 428/688, 689, 428/699, 912.2, 913; 359/359, 838

[56] References Cited

U.S. PATENT DOCUMENTS

| | | | |
|---|---|---|---|
| 4,714,308 | 12/1987 | Sawamura et al. | 350/1.7 |
| 4,765,729 | 8/1988 | Taniguchi | 351/163 |
| 4,856,019 | 8/1989 | Miyata et al. | 372/99 |
| 5,243,458 | 9/1993 | Hatano | 359/359 |

OTHER PUBLICATIONS

Scott McEldowney, et al., Proceedings of Optical Interference Coatings Conference, Jun. 1995, pp. 269–271, "Intrinsic Stress in Mixtures of Fluoride Thin Films".

J. A. Dobrowolski, et al., Applied Optics, vol. 31, No. 31, Nov. 1, 1992, pp. 6747–6789, "Interface Design Methods For Two-Material Optical Multilayer Coatings".

*Primary Examiner*—Elizabeth Evans
*Attorney, Agent, or Firm*—Oblon, Spivak, McClelland, Maier & Neustadt, P.C.

[57] ABSTRACT

The invention relates to a multilayer stack of fluoride materials usable in optics and its production process.

This stack is constituted by alternating layers of a first, high index, fluoride material such as $YF_3$ and a second, low index fluoride material such as LiF, able to form together a specific, stable compound such as $YLiF_4$, so that the interface between two adjacent layers of the stack is at least partly formed from said compound.

11 Claims, 3 Drawing Sheets

MULTILAYER STACK OF FLUORIDE MATERIALS USABLE IN OPTICS AND ITS PRODUCTION PROCESS

TECHNICAL FIELD

The invention relates to a multilayer stack of fluoride materials, usable for the treatment of optical components. This stack is e.g. able to ensure an optical function of the mirror, spectral filter or antireflection coating type, in the spectral range from the ultraviolet to the infrared, or can serve as a protective coating deposited on a pre-existent optical component, e.g. in order to protect it against damage by intense laser flows.

PRIOR ART

In the optical field, the performance of a given optical function, e.g. mirror, spectral filter or antireflection coating, can at least partly be fulfilled by means of a stack of thin layers or films, whose total thickness is typically between a few tenths of a micrometer and a few micrometers.

As a function of the complexity of the desired optical function, the stack comprises one or more materials having different optical indices. In most cases two materials, one having a high optical index $n_1$ and the other a low index $n_2$ lower than $n_1$, are sufficient for fulfilling these functions. The choice of materials is usually guided by purely optical considerations linked with optical constants of the materials (refractive index n and extinction coefficient k), but also their spectral transparency range. Among the numerous materials used at present, reference is specifically made to the following three main families:

—oxide compounds more particularly consisting of silica (low index), but also different oxides of titanium, tantalum, zirconium, hafnium, aluminium, etc. (high indices). These materials are widely used for applications in the visible range and in certain cases in the ultraviolet range.

—Materials specifically intended for applications in the infrared range, such as chalcogenides (ZnS, ZnSe) or germanium.

—Fluoride materials covering a wide range of compounds ($MgF_2$, $CaF_2$, $YF_3$, $LaF_3$, $NaAlF_4$, etc.) and which have the special feature of in most cases having a very wide spectral transparency range of typically 0.2 to 10 $\mu$m. Thus, they have an extremely wide potential application range extending from the deep ultraviolet to the infrared. Reference is e.g. made to their use in applications in the infrared ($YF_3$, $ThF_4$), or as antireflection materials in the visible range ($CaF_2$, $MgF_2$).

Fluoride materials offer clear optical advantages, particularly for the production of mirrors in the ultraviolet range, but their development in complex optical applications gives rise to certain problems, due to the difficulty in obtaining stacked structures of mechanically stable thin layers without any deterioration to the optical performance characteristics.

The problems encountered in producing a stack of thin fluoride layers are mainly due to the special mechanical properties of fluorides and their chemical nature.

Thus, fluorides have a high thermal expansion coefficient, on average ten times that of oxides, so that, following deposition, in the layers there are tensile stresses of several hundred MPa. Thus, for most applications, the fluoride layers are separated by cracking when their thickness exceeds approximately 1 $\mu$m.

In fluorides, the monovalent fluorine bond (—F) makes difficult chemical adhesion between the fluoride materials, which considerably limits the production of mechanically stable multilayer structures.

In addition, fluorides are materials which crystallize easily at low temperatures. Consequently the different interfaces in the stacks of fluoride layers generate optical losses by diffusion, whose level can become critical, particularly in the ultraviolet range.

In order to obtain a satisfactory stack of fluoride layers, it is consequently necessary to improve on the one hand the mechanical properties of the fluoride layers (stresses, density) and on the other the mechanical and optical characteristics of the interfaces (adhesion, diffusivity).

Fluoride layers are generally obtained by vacuum deposition methods, particularly vacuum evaporation methods. In these methods, the material flow deposited has a very low energy and consequently the layers obtained are porous or inhomogeneous. It is possible to obviate this problem by depositing the layers not in order to densify them and reduce the tensile stresses. However, as indicated by R. Chow et al in SPIE, vol. 1848, 1992, pp 312–321, in the case of the material pairs $LaF_3/NdF_3$ or $GdF_3/Na_3AlF_6$, the very high tensile stresses in the stack of alternating layers limit the stacks to a maximum of five pairs, so that the maximum reflectivity is limited to 50% at 355 nm.

In order to limit these mechanical problems, the solutions envisaged consist either of mechanically stabilizing the layers using energetic deposition processes, or modifying the composition of the layers.

Thus, the ion beam deposition or IAD and ion beam sputtering or IBS methods have been developed for this purpose (cf. Izawa et al: SPIE, vol. 1848, 1992, pp 322–329, and SPIE, vol. 2114, 1993, pp 297–308; J. Kolbe et al: SPIE, vol. 1624, 1991, pp 221–235; SVC "36th Annual Technical Conference Proceedings", 1993, pp 44–50, and SPIE, vol. 1782, 1993, pp 435–446).

A modification of the composition of the layers, e.g. by incorporating $SrF_2$ in $YF_3$ or $LaF_3$, has been described by S. McEldowney and L. Brown, Proceedings of Optical Interference Coatings Conference, Tucson, June 1995, pp 269–271. This $SrF_2$ incorporation makes it possible to reduce the tensile stresses in $YF_3$ and $LaF_3$, but it is accompanied by a significant roughness increase, which is prejudicial to the quality of the interfaces between layers.

Thus, the known methods make it possible to improve the mechanical properties of layers, but no method is known making it possible to improve the adhesion between the layers. When the components are applied to short wavelengths ($\lambda$<250 nm), the mirror stack has an adhesion not exceeding 1.5 um and this lack of adhesion between the layers is not too prejudicial. However, for greater wavelengths such as $\lambda$=355 nm and a fortiori in the visible range, the mirror thicknesses exceed 2.5 $\mu$m and it is necessary to have in the stack particularly robust interfaces, otherwise the stack may not retain its physical cohesion.

Consideration could be given to reinforcing these interfaces using an intermediate layer of the oxide type able to adhere to the two fluoride layers in question. However, in the case of a multilayer stack, the addition of said intermediate layer complicates the deposition process and multiplies the number of interfaces by two. This is prejudicial to the intrinsic reliability of the component, particularly as regards resistance to intense laser flows and may also increase the optical losses of the final component, due to the increase in the number of interfaces coupled with light diffusion phenomena at said interfaces.

DESCRIPTION OF THE INVENTION

The present invention relates to a multilayer stack of fluoride materials for optical components making it possible to solve the particular problem of lack of adhesion between the layers of the stack.

According to the invention, the multilayer stack of fluoride materials for an optical component, constituted by alternating layers of a first, high index material $n_1$ and a second, low index material $n_2$ lower than $n_1$, is characterized in that the first and second materials are transparent fluorides able to form with one another a clearly defined, stable compound, and in that the interface between each layer of the first material and each layer of the second material is at least partly formed by said clearly defined, stable compound.

Thus, according to the invention, as a result of an appropriate choice of the fluorides constituting the first and second materials of the alternating layers, particularly robust interfaces are obtained having very close optical properties of the first and second materials, particularly with regards to the transparency range.

Thus, due to the strong chemical affinity between the first and second materials, the adhesion of the two materials is significantly improved. Moreover, the interface formed can be very thin (a few monoatomic films), which avoids diffusion-based optical loss problems.

According to a first embodiment of the invention, the interface is mainly constituted by the clearly defined, stable compound, resulting from the combination of the two materials.

In this case, the structure of the stack corresponds to an alternating succession of layers of the first and second materials interconnected by interfaces with a thickness of a few nanometers, mainly formed by the defined compound.

According to a second embodiment of the invention, the interface is a gradual interface comprising a mixture of the first material and the defined compound, then a mixture of the second material and the defined compound, the composition of said interface evolving in such a way as to pass progressively from the composition of the first material to the composition of the second material.

With regards to the adhesion, the structure is a priori equivalent to that obtained in the first embodiment of the invention, but has the supplementary advantage of completely eliminating the interfaces with respect to the optics.

According to the invention, the fluorides used for the two materials are chosen as a function of their transparency range. Thus, it is of particular interest that they are transparent over a very wide optical spectrum, e.g. in the wavelength range from 200 nm to 12 $\mu$m. They are also chosen so as to form a clearly defined, stable compound.

As fluoride materials suitable for producing high index layers $n_1$, reference can be made to the fluorides $ErF_3$, $YF_3$, $CeF_3$ and $BaF_2$.

Examples of fluoride materials usable for producing low index layers $n_2$ are the fluorides $LiF$, $KF$, $BaF_2$ and $AlF_3$.

These materials can in particular be combined in the manner illustrated in the following table 1.

TABLE 1

| First material (high index $n_1$) | Second material (low index $n_2$) | Defined, stable compound |
|---|---|---|
| $YF_3$ | $LiF$ | $YLiF_4$ |
| $YF_3$ | $BaF_2$ | $YBaF_5$ |
|  |  | $Y_2Ba_2F_8$ |
| $YF_3$ | $KF$ | $KY_3F_{10}$ |
| $ErF_3$ | $LiF$ | $LiErF_4$ |

TABLE 1-continued

| First material (high index $n_1$) | Second material (low index $n_2$) | Defined, stable compound |
|---|---|---|
| $CeF_3$ | $KF$ | $K\,CeF_4$ |
|  |  | $K_3CeF_6$ |
|  |  | $Ba_3AlF_9$ |
| $BaF_2$ | $AlF_3$ | $Ba_3Al_2F_{12}$ |
|  |  | $BaAlF_5$ |
|  |  | $Ba_2Al_3F_{13}$ |

For example, the total thickness of the stack can be 0.1 to 100 $\mu$m.

In order to obtain interfaces according to the invention, it is possible to produce the multilayer stack by vacuum deposition, preferably by intrinsically energetic vacuum deposition, e.g. using ion beam sputtering or IBS.

In addition, the invention also relates to a process for the production of a multilayer stack of a first and a second fluoride materials, according to which each layer of the first and second materials is deposited by ion beam sputtering from targets respectively constituted by the first fluoride material and the second fluoride material.

The ion beam sputtering source can be an ion gun making it possible to produce an ion beam having an appropriate energy, e.g. from 500 to 2000 eV.

When it is wished to obtain interfaces mainly formed by the clearly defined, stable compound formed by the combination of the two materials, successive, alternating sputtering takes place of each of the targets corresponding to these materials.

Conversely, when it is wished to have progressive interfaces, it is necessary to have a second ion sputtering source and the passage from one layer to the other then takes place by sputtering at the same time the two targets and the time modulation of the ion sputtering current of one of the targets compared with the other, so as to obtain a progressive and continuous interface composition profile.

According to the invention, the choice of ion beam sputtering, which produces a flow of material ten to one hundred times more energetic than evaporation offers numerous advantages.

Thus, it makes it possible to induce in the fluoride layers compressive stresses (a few hundred MPa), which permits the deposition of thick structures up to 100 $\mu$m. Moreover, the thus deposited layers are characterized by a particularly high density (above 90% of the value of the solid material). Thus, unlike in the case of layers produced by vacuum evaporation or deposition, they are only very slightly sensitive to the environment. Thus, a change to the surrounding humidity leads to no significant variation of the mechanical stresses and the optical response of the multilayer component. This is of particular interest when account is taken of the extreme avidity of fluoride materials with respect to water.

Finally, the use of the ion beam sputtering method for the fluorides has the advantage of minimizing optical diffusion at low wavelengths in the ultraviolet.

However, with the conventional fluoride evaporation method, mirrors are obtained, whose performance characteristics in the deep ultraviolet (e.g. at 193 nm) are nowadays limited by the strong diffusion of the deposits.

Other features and advantages of the invention can be gathered from the following description with reference to the attached drawings.

DETAILED DESCRIPTION OF EMBODIMENTS

In the following description the first, high index fluoride material $n_1$ is yttrium fluoride $YF_3$ and the second, low index fluoride material $n_2$ is lithium fluoride LiF. These two materials can be combined to give the clearly defined compound $YLiF_4$. Bearing in mind this strong chemical affinity, the adhesion between $YF_3$ and LiF is greatly improved. The thus formed interface has the advantage of extreme thinness (a few monoatomic films) and also of being formed by $YLiF_4$, whose optical properties are very close to those of $YF_3$ and LiF, particularly with respect to the transparency range.

It is pointed out that $YF_3$ is transparent over a very wide optical spectrum covering the wavelength 0.2 to 13 $\mu$m and that LiF is also transparent over a very wide optical spectrum from 0.1 to 5 $\mu$m.

Figure 1:
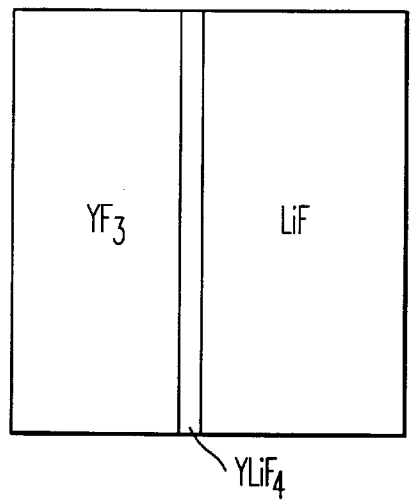
FIG. 1 diagrammatically shows the single interface between two layers of a multilayer stack according to the first embodiment of the invention.

In order to prepare a stack according to the first embodiment of the invention, the two materials are alternately deposited by ion beam sputtering of a $YF_3$ target and a LiF target and each layer is obtained by sputtering the corresponding target. The interfaces obtained in this case are shown in FIG. 1. In FIG. 1, it is possible to see the interface formed of $YLiF_4$ between a layer of the first material $YF_3$ and a layer of the second material LiF. It is an interface having a very limited thickness (a few nm).

Figure 2A:
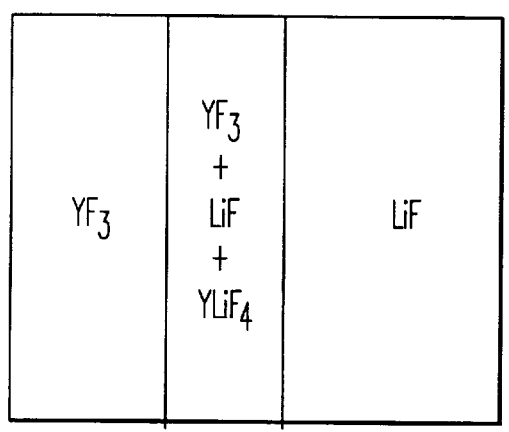
FIG. 2 shows the gradual interface between two layers of a multilayer stack according to the second embodiment of the invention.
Figure 2B:
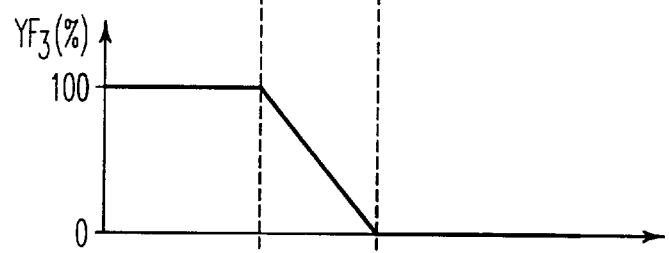
Figure 2C:
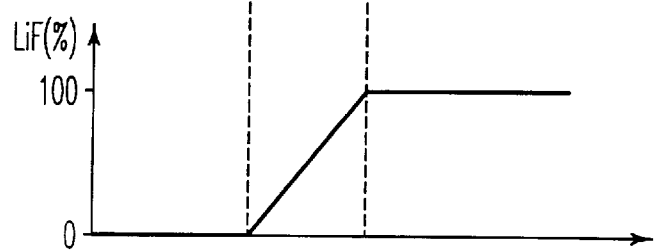

FIG. 2 shows the interface obtained according to the second embodiment of the invention, in which the layers are once again produced by ion beam sputtering from the same targets, but using two ion sputtering sources and by modulating, as a function of time, the ion sputtering current of one of the targets compared with the other, so as to produce a continuous interface composition profile between pure $YF_3$ and pure LiF.

Thus, as can be seen in FIG. 2, in this case the interface between a $YF_3$ layer and a LiF layer is formed by a mixture of $YF_3$, LiF and $YLiF_4$. The $YF_3$ concentration of the interface varies linearly as a function of time from 100% to 0%, as represented at B in FIG. 2, whilst the LiF concentration (C, FIG. 2) passes from 0 to 100% during the same time, corresponding to the production of the interface.

The characteristics of the LiF and $YF_3$ layers produced by ion beam sputtering are as follows:
— $YF_3$: $n_1$ at 355 nm=1.54±0.2
— LiF: $n_2$ at 355 nm=1.41±0.2
— extinction coefficient (k) at 355 nm of each layer $k \leq 1.10^{-3}$.

The following examples illustrate the production of multilayer stacks formed from alternating layers of $YF_3$ and LiF.

EXAMPLE 1

Stack of Four Alternating Layers

In order to produce this stack, use is made of ion beam sputtering using an ion gun generating an ion beam with an energy of 1100 eV and two $YF_3$ and LiF targets. Thus, on a silica substrate are deposited four alternating layers of $YF_3$ and LiF, namely two $YF_3$ layers and two LiF layers, having a thickness of 58 nm for $YF_3$ and 64 nm for LiF.

Determination then takes place of the optical response of the stack, namely its reflection R and transmission T, as a function of the wavelength (in nm). The broken line curves R1 and T1 in FIG. 3 respectively illustrate the results obtained in reflection and transmission with said stack.

EXAMPLE 2

Production of a Stack Constituted by Six Alternating Layers

The same operating procedure as in example 1 is followed for depositing six alternating layers of $YF_3$ and LiF (three $YF_3$ layers and three LiF layers) and the optical response of the stack is also determined.

Figure 3:
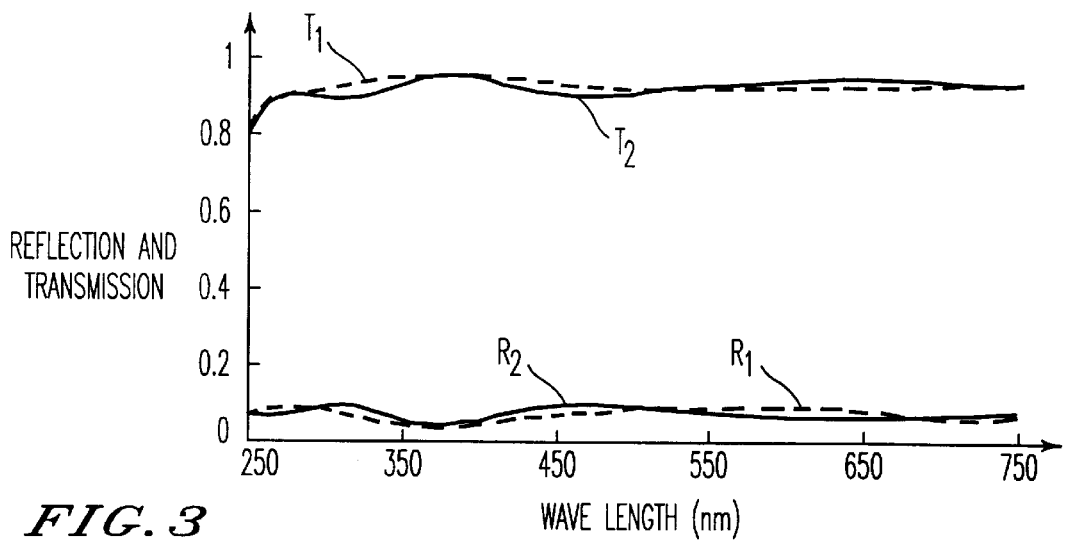
FIG. 3 is a graph illustrating the reflection (R) and the transmission (T) of two multilayer stacks according to the invention as a function of the wavelength (in nm).

The results obtained are given in FIG. 3, where curve R2 represents the reflection of said stack and curve T2 the transmission. Thus, in accordance with the number of deposited layers, the pair $YF_3$/LiF makes it possible to modulate the optical response of the stack. In addition, such a multilayer stack can be used as a protective layer, because it has a good behaviour under a laser flow, particularly in the ultraviolet. At the breaking fluence of the stack, it is found that the latter, despite the laser damage, has lifted from the substrate, but there is no separation of the alternating fluoride layers, which demonstrates the extreme stability of the $YF_3$/LiF bond.

EXAMPLE 3

Dichroic Mirror Centred at $\lambda=3\,\omega$ (351 nm)

Figure 4:
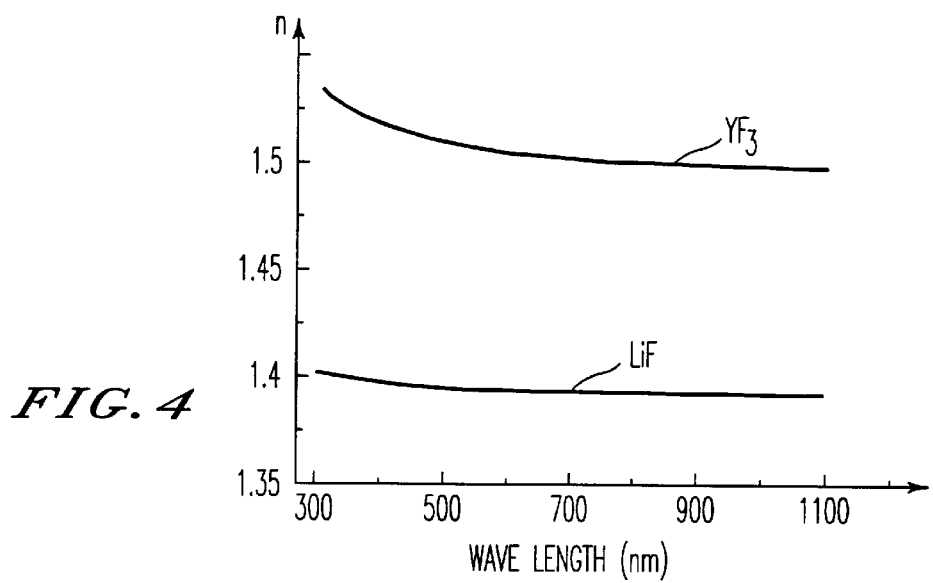
FIG. 4 illustrates the refractive indices of the fluoride materials $YF_3$ and LiF as a function of the wavelength (in nm).
Figure 5:
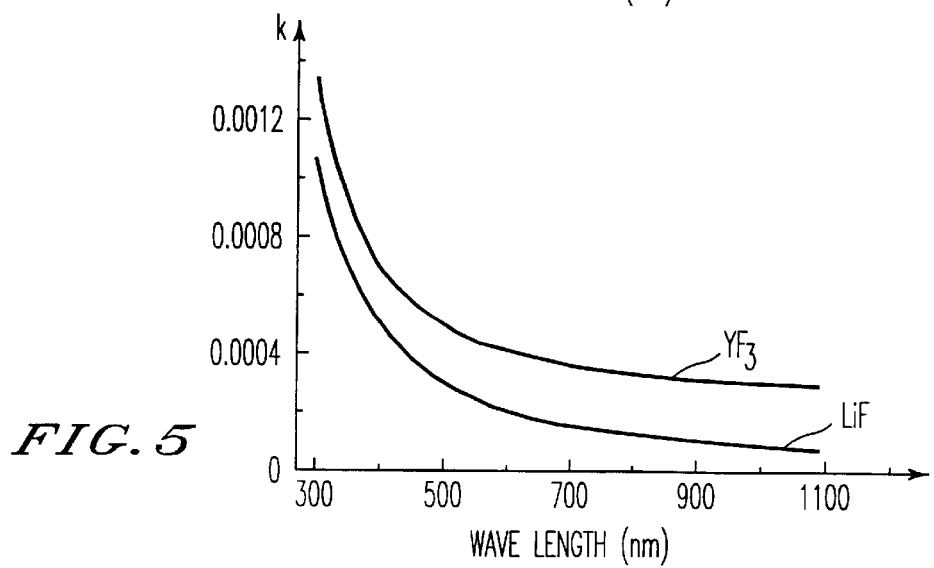
FIG. 5 illustrates the variations of the extinction coefficient (k) of $YF_3$ and LiF as a function of the wavelength (in nm).

Prior to producing this stack, the optical characteristics of the $YF_3$ and LiF monolayers were determined as a function of the wavelength in the wavelength range 300 to 800 nm. The curves of FIG. 4 represent the variations of the refractive index (n) of $YF_3$ and LiF, as a function of the wavelength. FIG. 5 shows the variations of the extinction coefficients (k), as a function of the wavelength.

On the basis of these characteristics, a stack was produced constituted by alternating layers of $YF_3$ and LiF of thicknesses $e_1$ and $e_2$, such that $ne=\lambda/4$. The thicknesses of the layers were respectively $e_1$=58 nm for $YF_3$ and $e_2$=64 nm for LiF. Thus, stacking took place of 61 alternating layers starting and finishing with $YF_3$. The total thickness of the stack was 3.7 $\mu$m.

Figure 6:
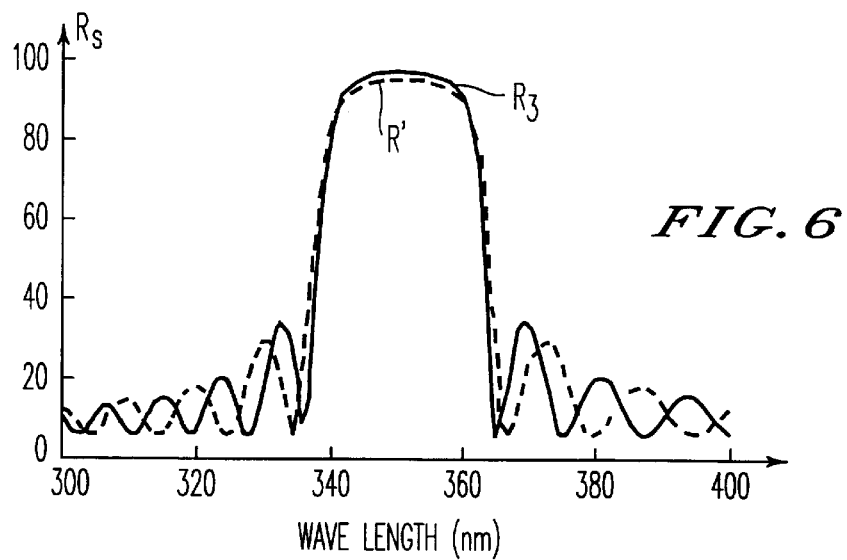
FIG. 6 illustrates the reflectivity (Rs) as a function of the wavelength (in nm) of a dichroic mirror formed from alternating $YF_3$ and LiF layers.

Curve R3 of FIG. 6 illustrates the reflectivity of such a stack, as a function of the wavelength. Thus, there is a maximum reflectivity of 97% at 351 nm.

EXAMPLE 4

Dichroic Mirror Centred at 351 nm

In this example, preparation took place of a stack of alternating $YF_3$ and LiF layers, using as targets LiF and $YF_3$ having an extinction coefficient at 355 nm of $5.10^{-5}$, i.e. using a composition as near as possible to stoichiometry.

Figure 7:
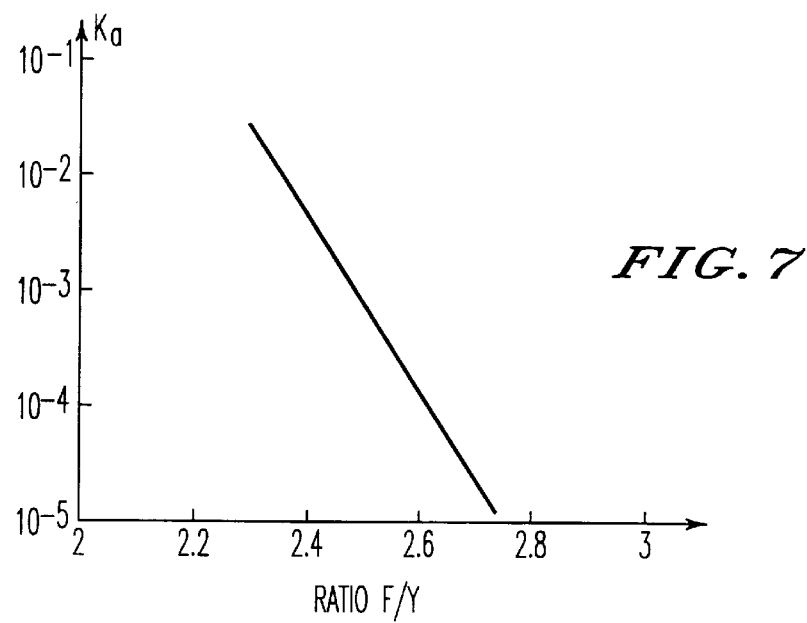
FIG. 7 is a graph illustrating the evolution of the extinction coefficient (k) of $YF_3$ as a function of the ratio F/Y.

FIG. 7 shows the evolution of the extinction coefficient (k) of $YF_3$ at 355 nm, as a function of the ratio F/Y in the $YF_3$ layer. Thus, the extinction coefficient can be as low as $1.6.10^{-5}$.

The mirror prepared with 51 alternating layers 25(HB)H of $YF_3$ and LiF of this type, starting and finishing with a $YF_3$ layer, has a total thickness of 3.1 μm.

The increase in the ratio F/Y is obtained by aiding during deposition the fluoridizing of the layers, e.g. by reactive sputtering of a $YF_3$ target in a fluorine gas atmosphere ($CF_4$).

FIG. 7 shows that by improving the composition of the layers in such a way that the composition ratio F/Y approaches that of solid $YF_3$, it is possible to reduce the absorption.

Figure 8:
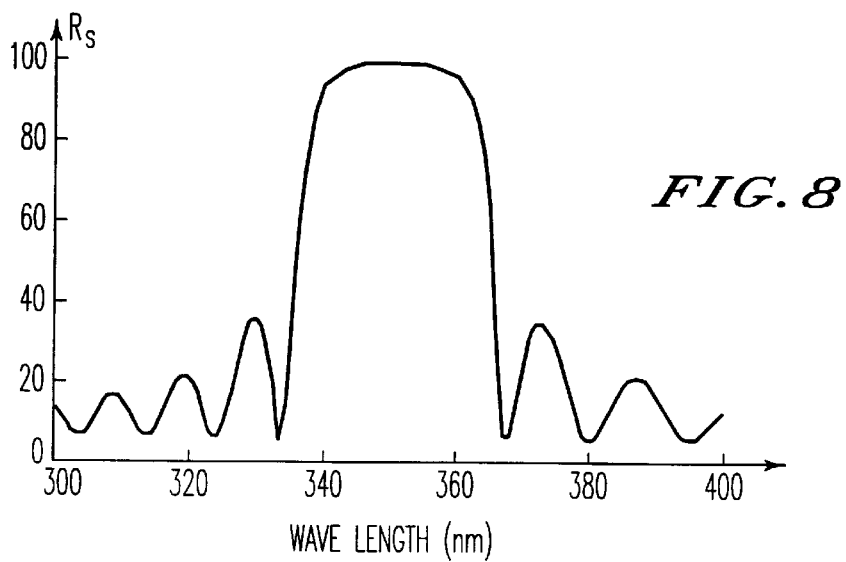
FIG. 8 illustrates the reflectivity (Rs) as a function of the wavelength of a dichroic mirror according to the invention.

Its reflectivity characteristics are given in FIG. 8, which shows the reflectivity of the mirror as a function of the wavelength. It is pointed out that there is a maximum reflectivity of 99% at 351 nm with a stack constituted by 25(HB)H.

However, a mirror produced in the same way with layers having the reflectivity characteristics of example 3, i.e. a lower transparency, leads to a reflectivity not exceeding 95% (curve R' in FIG. 6).

EXAMPLE 5

Trichroic Mirror

In this example a mirror is produced having a maximum reflectivity at $\lambda=3\omega$ and an antireflection behaviour at $\lambda=2\omega$ and $\lambda=\omega$. In order to obtain this result, use is made of $YF_3$ and LiF layers having the same characteristics as those used in example 4, but the thicknesses of the layers are no longer periodically the same. They can vary for the two materials, typically from 10 nm to 100 nm. (In order to obtain the aforementioned optical function, there are several possible layer successions).

The multilayer stacks obtained according to the invention can be used for producing ultraviolet mirrors, particularly at the wavelengths 193, 248 or 355 nm, or for producing more complex functions (trichroic mirrors, spectral filters) able to resist high laser fluences. It is also possible to use these stacks for protecting already existing optical components, e.g. oxide mirrors, so as to improve their resistance to the laser flow. These stacks may also be suitable for producing antireflection layers in the ultraviolet, visible or infrared ranges, which are optically and mechanically stable for any application requiring these properties.

We claim:

1. Multilayer stack of fluoride materials for an optical component, constituted by alternating layers of a first, high index material $n_1$ and a second, low index material $n_2$ lower than $n_1$, characterized in that the first and second materials are transparent fluorides able to form with one another a clearly defined, stable compound, and in that the interface between each layer of the first material and each layer of the second material is at least partly formed by said clearly defined, stable compound.

2. Stack according to claim 1, characterized in that the interface is mainly constituted by the clearly defined, stable compound resulting from the combination of the two materials.

3. Stack according to claim 1, characterized in that the interface is a gradual interface comprising a mixture of the first material and the defined compound, then a mixture of the second material and the defined compound, so as to pass progressively from the composition of the first material to the composition of the second material.

4. Stack according to any one of the claims 1 to 3, characterized in that the first material is chosen from among $ErF_3$, $YF_3$, $CeF_3$ and $BaF_2$ and in that the second material is chosen from among LiF, KF, $BaF_2$ and $AlF_3$.

5. Stack according to claim 4, characterized in that the defined compound is chosen from among $YLiF_4$, $Y_3KF_{10}$, $LiErF_4$, $KCeF_4$, $K_3CeF_6$, $Ba_3AlF_9$, $Ba_3Al_2F_{12}$, $BaAlF_5$, $Ba_2Al_3F_{13}$, $Ba_2Y_2F_8$ and $YBaF_5$.

6. Stack according to any one of the claims 1 to 3, characterized in that the first material is $YF_3$ and the second material is LiF and the defined compound is $YLiF_4$.

7. Stack according to any one of the claims 1 to 6, characterized in that it has a total thickness of 0.1 to 100 μm.

8. Process for the production of a multilayer stack according to claim 2, characterized in that successive deposition takes place of the layers of the stack by vacuum deposition by alternately sputtering by means of an ion beam a target of the first material and a target of the second material.

9. Process for the production of a multilayer stack according to claim 3, characterized in that successive deposition takes place of the layers of the stack by vacuum deposition from a target of the first material and a target of the second material, by ion beam sputtering using two ion beams so as to alternately deposit a layer of the first material and then a layer of the second material and simultaneously depositing the first and second materials during the passage from one layer to the other by the time modulation of the sputtering current of one of the targets compared with the other so as to obtain a progressive and continuous interface composition profile between two successive layers.

10. Optical component comprising a multilayer stack according to any one of the claims 1 to 7.

11. Optical component according to claim 10, characterized in that the stack serves as a mirror, a spectral filter or an antireflection coating.

* * * * *